United States Patent [19]

Watanuki et al.

[11] Patent Number: 5,646,882

[45] Date of Patent: Jul. 8, 1997

[54] HIGH DENSITY RECORDING AND PLAYBACK DEVICE

[75] Inventors: Osaaki Watanuki, Kawasaki; Satoshi Tsuji, Ayase; Yoshihiro Ikeda, Nagatahigashi, all of Japan

[73] Assignee: International Business Machines Corporation, Armonk, N.Y.

[21] Appl. No.: 389,834

[22] Filed: Feb. 15, 1995

[30] Foreign Application Priority Data

Feb. 15, 1994 [JP] Japan .................................. 6-018401

[51] Int. Cl.$^6$ ........................................... G11C 11/06
[52] U.S. Cl. .................................... 365/151; 365/171
[58] Field of Search ................................ 365/151, 157, 365/171, 174, 118, 158, 217, 237; 369/43, 126, 44.14, 44.25, 124; 250/366, 320

[56] References Cited

U.S. PATENT DOCUMENTS

| 5,278,704 | 1/1994 | Matsuda et al. | 365/141 |
|---|---|---|---|
| 5,289,408 | 2/1994 | Mimura et al. | 365/151 |
| 5,317,533 | 5/1994 | Quate et al. | 365/151 |
| 5,371,777 | 12/1994 | Shido et al. | 365/151 |
| 5,375,087 | 12/1994 | Moreland et al. | 365/151 |
| 5,375,114 | 12/1994 | Hatanaka et al. | 365/151 |
| 5,461,605 | 10/1995 | Takimoto et al. | 369/126 |

OTHER PUBLICATIONS

H.J. Mamin et al., "Atomic Emission from a Gold Scanning–Tunneling–Microscope Tip", The American Physical Society, vol. 65, No. 19, 5 Nov. 1990, pp. 2418–2421.

R.C. Barrett and C.F. Quate, "Charge storage in a nitride–oxide–silicon medium by scanning capacitance microscopy", J. Appl. Phys. 70(5), 1 Sep. 1991, pp. 2725–2733.

R.C. Barrett and C.F. Quate, "Large–scale charge storage by scanning microscopy", Elsevier Science Pub. B.V., 42–44, (1992), pp. 262–267.

J. Moreland and P. Rice, "High–resolution, tunneling–stabilized magnetic imaging and recording", Appl. Phys. Lett. 57(3), 16 Jul. 1990, pp. 310–312.

O. Watanuki et al., "Small Magnetic Patterns Written With a Scanning Tunneling Microscope", IEEE Transactions on Magnetics, vol. 27, No. 6, 1 Nov. 1991, pp. 5289–5291.

T. Ohkubo et al., "Submicron Magnetizing and Its Detectioon Based on Point Magnetic Recording Concept", IEEE Transactions on Magnetics, vol. 27, No. 6, Nov. 1991, pp. 5286–5288.

J.C. Slonczewski, "Magnetic theory of very small devices (invited)", J. Appl. Phys. 67(9), 1 May 1990, pp. 5341–5346.

K. Sueoka et al., "Study of tip magnetization behavior in magnetic force microscope", J. Vac. Sci. Technol. B 9(2), Mar./Apr. 1991, pp. 1313–1317.

O. Watanuki, "Magnetic Flux Return Path For High–Density Vertical Recording", IBM Technical Disclosure Bulletin, vol. 32, No. 8A, Jan. 1990, pp. 362–363.

*Primary Examiner*—Tan T. Nguyen
*Attorney, Agent, or Firm*—Robert M. Trepp

[57] ABSTRACT

This invention provides a high switching rate tip for a high density recording system using scanning probe microscope (SPM). This new tip improves the switching rate in a data writing operation. This tip is constituted with a non-magnetic material core and a thin film coat of high permeable magnetic material. The diameter of the tip is on the order of 100 nm and the thickness of the high permeable magnetic coat is approximately 1000–2000 angstroms. The core is made of non magnetic material such as W, Pt, Ir, PtIr and Au. The magnetic coat is, for example, NiFe, CoZrNb, CoFeSiB. Further, this invention adopts a flat coil formed on a medium by lithography. The coil is used to switch the magnetization of the tip. This flat coil improves the process of the fabrication of a SXM recording device.

13 Claims, 2 Drawing Sheets

HIGH DENSITY RECORDING AND PLAYBACK DEVICE

FIELD OF THE INVENTION

The present invention relates to a magnetic recording and playback device incorporating a recording tip with tunneling current and using a scanning probe microscope and, more particularly, to the switching speed of a recording tip to improve the recording speed using simple manufacturing processes and an improved coil configuration.

BACKGROUND OF THE INVENTION

Generally, a microscope using a probe is called a scanning probe microscope (SPM) or a scanning X microscope (SXM) (X is a local physical quantity on a surface such as a tunneling current, a force among atoms, etc.). Its application field has spread to surface observation of metal, semiconductors, etc., and observation of the magnetic domain of a magnetic material, etc. Recently, the development of a high-density recording technique device using a SPM has become widespread.

For example, the following reference texts have been published regarding the application of a SXM to high-density magnetic recording:

(1) H. J. Mamin, P. H. Guethner, and D. Rugar, "Atomic Emission from a Gold Scanning-Tunneling-Microscope Tip," Phys. Rev. Lett., Vol. 65, No. 19, pp. 2418–2421, 5, Nov. 1990.

(2) R. C. Barrett and C. F. Quate, "Charge storage in a nitride-oxide-silicon medium by scanning capacitance microscopy," J. Appl. Phys. 70 (5), 1991, pp. 2725–2733.

(3) R. C. Barrett and C. F. Quate, "Large-scale charge storage by scanning capacitance microscopy," Ultramicroscopy 42–44 (1992), pp. 262–267.

(4) J. Moreland and P. Rice, "High-resolution tunneling-stabilized magnetic imaging and recording," APPL. Phys. Lett., 57 (3), 310, 1990, pp. 310–312.

(5) O. Watanuki, S. Tsuji et al., "Small magnetic patterns written with a scanning tunneling microscope," IEEE Trans. Magn., Vol. 27, No. 6, Nov. 1991, pp. 5289–5291.

(6) T. Ohkubo, J. Kishigami et al., "Submicron magnetizing and its detection based on the point magnetic recording concept," IEEE Trans. Magn., Vol. 27, No. 6, 1991, pp. 5286–5288.

Recently, a data recording and playback device using a proposed STM is used to perform magnetic recording on a recording medium, comprising placing a conductive tip near the surface of the magnetic recording medium, moving the relative position of the tip and the medium under a constant tunneling current, supplying the current in response to data to the coil around the tip, and generating a magnetic field. In playback, this determines the Z position of the tip with the tunnel current generated through placing the tip near the surface of the magnetic recording medium, and reads information on the magnetic recording medium using the magnetoresistance (MR) effect. For a probe of a MR sensor coated with a thin NiFe film, see for example reference (7), J. C. Sclonczewski, "Magnetic theory of very small devices (invited)," J. Appl. Phys. 67 (9), 1 May 1990, pp. 5341–5346.

This describes, for example, to place the tip comprising a magnetic material, such as Ni or Permalloy, near a vertical recording medium made of Co—Cr, to maintain this position, and to perform recording and playback, wherein a piezo element is used for position control.

Barrett et al. achieved a recording density of 50 Mb/in$^2$, using charge traps in $SiO_2$ between p-type Si and $Si_3N_4$ see references (2) and (3). This method enables high-density recording, but has the disadvantage of being difficult to use to retain data due to the discharge of electric charges with the passage of time.

Forming submicron magnetic patterns with a SXM has been realized see references (4), (5), (6). With these techniques, a magnetic dot size is 400–800 nm, and this is equivalent to storage in the range from 4 to 1 Gb/6.45 sq cm (Gb/in$^2$).

In the disclosed techniques, it has been difficult to turn the magnetized direction of the tip point in reverse at high speed, that is, to switch it at high speed. Following the proposed prior art, their switching speed is on the order of some KHz and, hence, this is the limit on data recording through achieving switching at 200–300 KHz. For the switching speed of a tip, see reference (8).

(8) K. Sueoka, K. Okuda et al., "Study of tip magnetization behavior in magnetic force microscope," J. Vac. Sci. Technol., B 9 (2), pp. 1313–1317, Mar/Apr 1991.

The configuration shown in reference (9) is applicable as a return path of magnetic fluxes:

(9) O. Watanuki, "Magnetic Flux Return Path for High-Density Vertical Recording," IBM IDB, Vol. 32, No. 8A, pp. 362–363, Jan. 1990.

In forming a magnetic pattern, a coil must be formed around the magnetic tip to change the magnetized direction of the tip see reference (5). When tip permeability is sufficiently high, it is possible for the coil to turn the magnetized direction of the tip edge in reverse, if it separates from the tip edge. In the case of a tip coated with a magnetic thin film, however, the coil must be formed near the tip edge. When winding a coil around the tip, a probe should have a predetermined length, but this causes the tip to easily sense vibration, which is not good from a mechanical point of view. This vibration has the disadvantage of making fine positioning difficult. In a magnetic recording and playback device that generates a tunneling current and with which it is desired to achieve high-density recording, vibration is a problem.

SUMMARY OF THE INVENTION

In accordance with the present invention, the tip comprises a nonmagnetic material coated with a highly permeable magnetic material using lithography. A coil is disposed around the tip point or tip edge, switching the magnetized direction of the tip point or tip edge. This coil is insulated from the recording medium.

The invention mainly comprises a core made of a nonmagnetic material, a tip with a thin film of a soft magnetic material coating the core, a means for generating a tunneling current between the tip and the magnetic recording medium, a means for measuring the control voltage controlling the tunneling current, and to perform playback of recorded signals on the magnetic recording medium through a change in the control voltage.

Furthermore, the invention comprises a coil formed around the tip, and a means for supplying a signal current to the coil, and performs signal recording on the magnetic recording medium with a magnetic field generated in response to the signal current through supplying the signal current to the coil.

A nonmagnetic material forming the core comprises tungsten, platinum, iridium, platinum-iridium, gold, fiberglass, carbon fiber, or a combination of these. A soft magnetic material coating the core comprises NiFe, CoZrNb, or CoFeSiB, the thin film being 500–3000 Å thick.

One configuration that solves vibration problems involves shortening of the probe and fixing a flat coil on the medium surface. If the coil is formed on the medium using lithography, the efficiency of coil manufacture is considerably enhanced; it is possible to shorten the probe; and the problem of tip positioning is also improved.

The object of the present invention is to provide a device capable of high-speed recording and playback of data with elements capable of high-speed switching of the tip magnetizing direction, at least on the order of 10 MHz.

The present invention achieves high-speed switching with a tip where a nonmagnetic material is coated with a highly permeable magnetic thin film.

Another object of the invention is to form a coil on a medium using lithography, to improve the manufacturing efficiency of a high-density recording and playback device, and to reduce its cost.

Still another object is to provide a magnetic recording and playback device capable of high density magnetic data recording.

According to the invention, data recording can be performed at higher speed by accelerating the switching speed of a recording tip by means of forming magnetic patterns on a medium. Furthermore, this can be manufactured using simple processes with an improved coil configuration.

BRIEF DESCRIPTION OF THE DRAWINGS

These and other features, objects, and advantages of the present invention will become apparent upon consideration of the following detailed description of the invention when read in conjunction with the drawing in which.

DESCRIPTION OF THE PREFERRED EMBODIMENT

Figure 1:
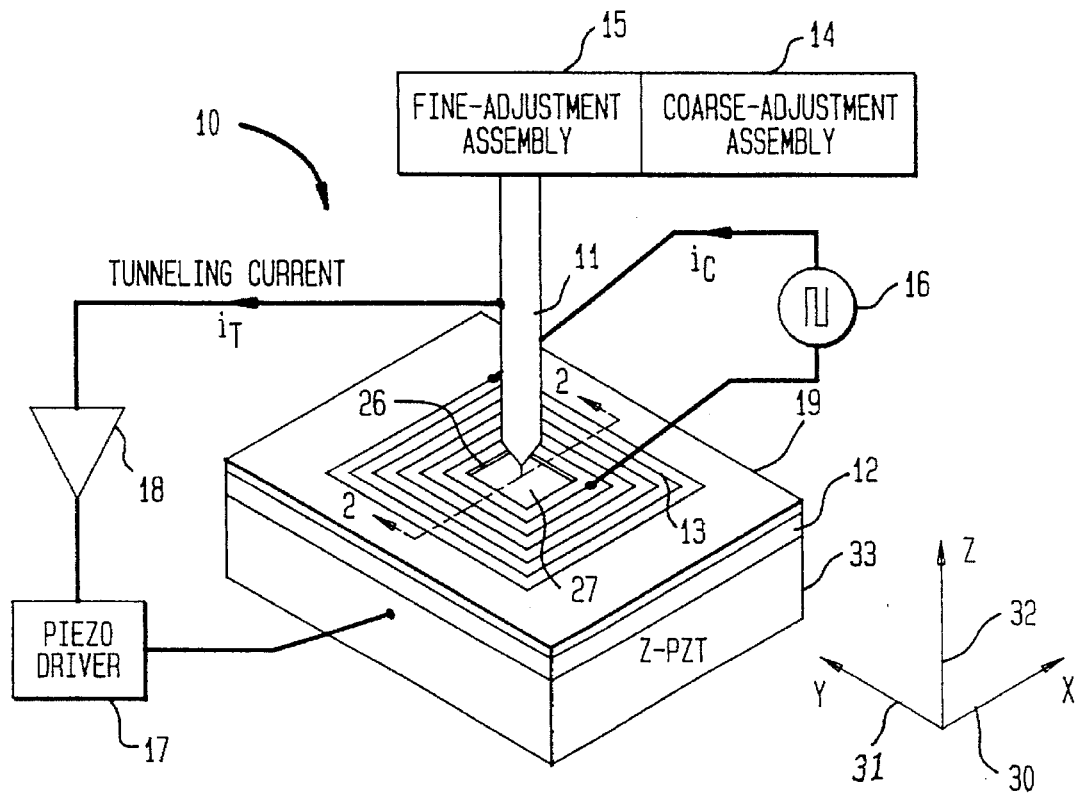
FIG. 1 is a schematic diagram showing the structure of a high-density recording and playback device according to the invention.
Figure 2:
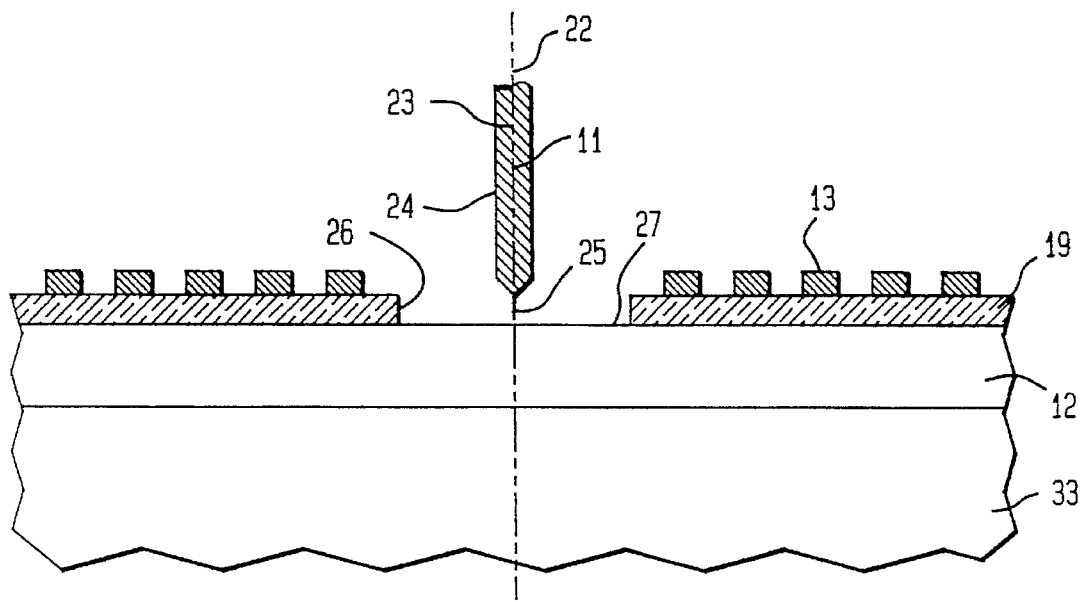
FIG. 2 is an enlarged cross-sectional view along the line 2—2 of FIG. 1 showing the relationship of the tip, coil, and medium of a high-density recording and playback device according to the invention.

Referring to the drawings, FIG. 1 shows a high density recording device 10. FIG. 2 shows a cross section view along the line 2—2 of FIG. 1.

A tip 11 comprises a core 23 shown in FIG. 2 made of a nonmagnetic material, coated with a thin film 24 of a highly permeable magnetic material such as by sputtering. Tip 11 has a longitudinal axis 22. The material of core 23, for example, comprises tungsten, platinum, iridium, platinum-iridium, gold, etc., individually or combinations thereof. The magnetic material of thin film 24, for example, comprises Fe, NiFe, CoZrNb, CoFeSiB, etc., individually or combinations thereof. A curvature radius of the tip point or tip edge 25 is usually on the order of 100 nm, and the coated film 24 of a magnetic material is about 500–3000 Å thick, preferably 1000–2000 Å thick. In a switching speed test of a magnetic force microscope (MFM) tip disposed about a thin film head, a 50-MHz switching speed was attained with a tungsten tip coated with Fe (reference(7)).

FIG. 1 shows a schematic diagram of a magnetic recording and playback device 10 according to the invention. A tip 11 is disposed near a magnetic recording medium 12 in opening 26, and a coil 13 is composed on the magnetic recording medium 12 using lithography. The tip 11 is connected to a coarse-adjustment assembly 14 and a fine-adjustment assembly 15, its position being controlled. The coarse-adjustment assembly 14, for example, is a voice coil meter (VCM) or a micromechanism. As the fine-adjustment assembly 15, a piezo element (PZT) may be used. In FIG. 1 showing an embodiment, the X and Y directions are shown by arrows 30 and 31, that is, the directions parallel to the surface of the magnetic recording medium, are controlled by the fine-adjustment assembly 15 connected to the tip, and the Z direction shown by arrow 32, that is, the direction vertical to the surface 27 of the magnetic recording medium 12, is adjusted by the Z piezo element 33, the distance between the tip and the surface 27 of the magnetic recording medium 12 being adjusted. Fine adjustment 15 provides a tunneling current between tip 11 and recording medium 12. Fine adjustment couples a signal in response to the tunneling current to amplifier 18. Amplifier 18 has an output coupled to piezo driver 17. A piezo Z driver 17 is connected to the piezo element 33.

As shown in FIG. 1, the coil 13 is composed on the magnetic recording medium 12 using lithography. Coil 13 is coupled to current waveform generator 16. Current waveform generator 16 functions to provide an electric current to coil 13. Magnetized direction switching is performed using coil 13, which is composed on an insulation film 19 with the magnetic recording medium 12 below film 19 and thus insulated from the coil 13. This insulation film 19, may be, for example, $SiO_2$ or $Al_2O_3$, several microns thick.

FIG. 2 shows tip 11 and the magnetic recording medium 12. The position of the tip 11 is controlled by the coarse-adjustment assembly 14 and the fine-adjustment assembly 15 to be near the magnetic recording medium 12. The coil 13 is formed around the recording domain of the magnetic recording medium 12 on insulation film 19 using lithography. The insulation film 19 is not formed on the information recording area in opening 26. The magnetic recording medium 12 has a protective film made of, for example, C, 100–200 Å thick. Magnetic recording medium 12 preferably has a vertical magnetized layer composed of two layers and also adequate coercive force. For example, this comprises a NiFe film a few microns thick on a substrate, and a CoCr film some 100–1000 Å thick on the NiFe film. The magnetic recording medium 12 is formed on the smooth surface of the substrate using sputtering.

Figure 3:
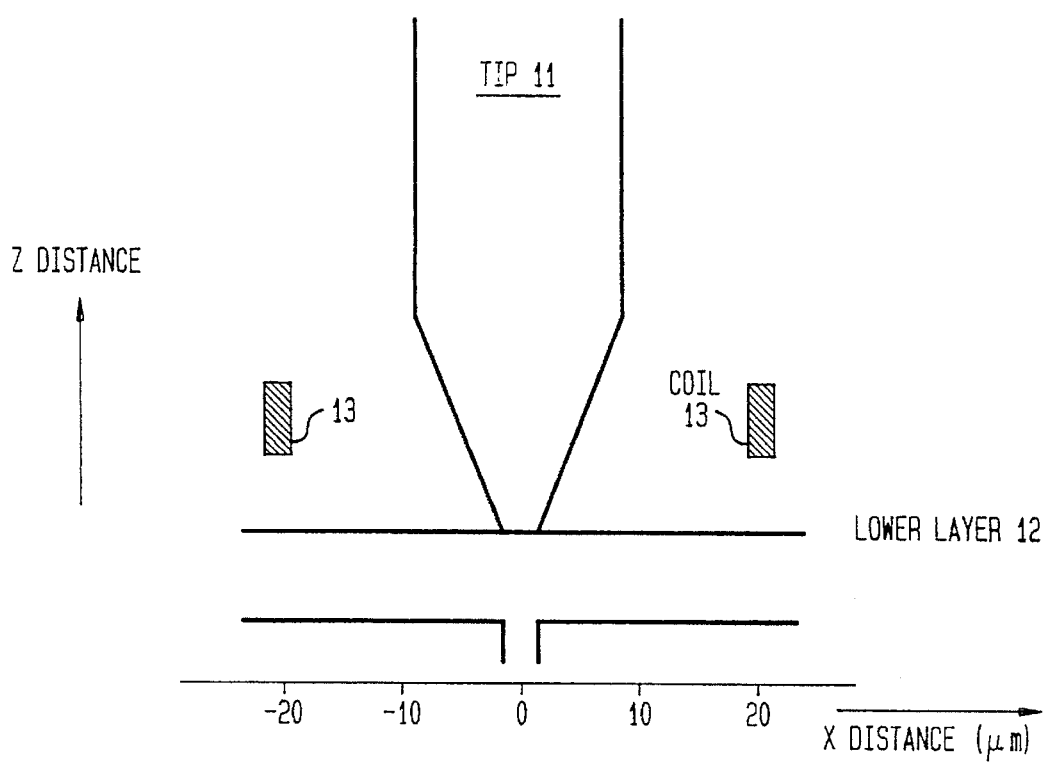
FIG. 3 is a schematic layout showing the physical positioning of the tip, coil and medium for use with FIG. 4.
Figure 4:
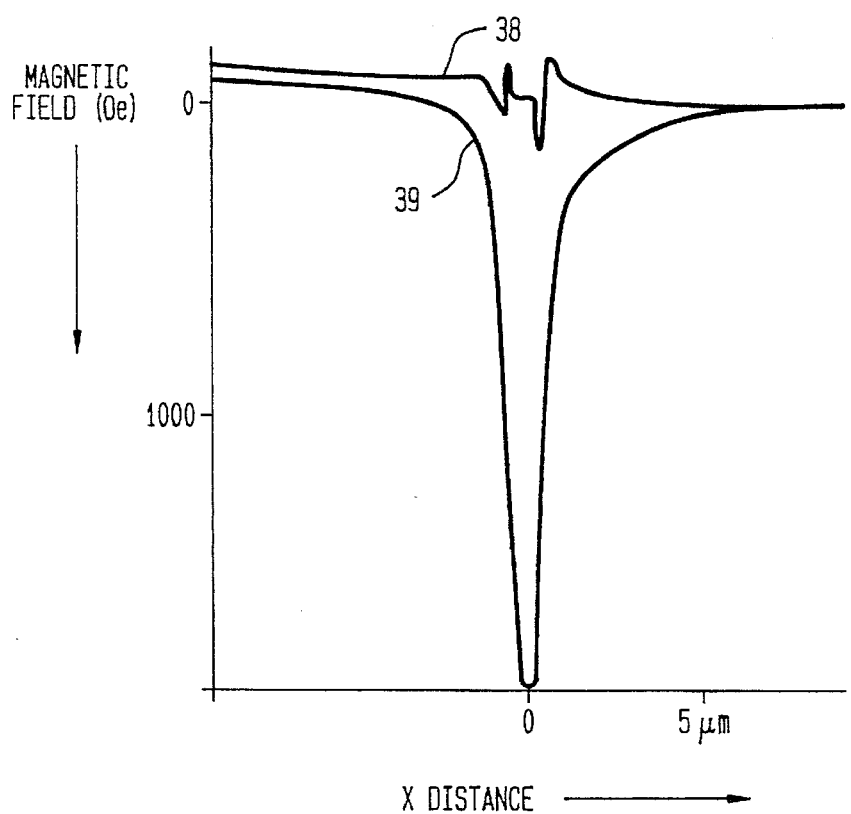
FIG. 4 is a graph showing the measurement results for magnetic fields generated by a high-density recording and playback device 10 according to the invention, using the boundary element method (BEM).

A simulation of the magnetic field from the edge of the tip was done by means of the boundary element method (BEM), assuming that the permeability of the tip and the lower layer is 1000, and that the medium 12 is 1000 Å thick. The result of this simulation is shown in FIGS. 3 and 4, where FIG. 3 shows the positioning of each component and FIG. 4 shows the magnetic field status. Curve 38 shows the horizontal magnetic field and curve 39 shows the vertical magnetic field. Actual recording is performed by the vertical magnetic field, so it is apparent that this has an excellent magnetic field characteristic. The vertical magnetic field concentrates upon about the tip point or tip edge, and thus attains high-density recording.

The tip moves in the X and Y directions through positioning by the coarse-adjustment assembly 14 and the fine-adjustment assembly 15.

As the coarse-positioning means, for example, a voice coil meter (VCM) or a micromechanism is used. As the fine-positioning means, a piezo element (PZT) is used. The magnetic recording medium 12 is on the Z-PZT 33, and the distance between the tip and the magnetic recording medium is maintained on the order of some Å or nm. It is also preferable that the X, Y, and Z PZTs be disposed only on the tip so as to drive the tip in three dimensions.

When the tip writes a magnetic dot at 300 nm, one bit cell size can be 500 nm. Assuming that a horizontal stroke or movement of the tip 11 is 1 cm, the recording capacity is 400 Mb/cm2, that is, 50 MB. Of course, it is possible to increase the recording capacity with a longer tip stroke and to increase the recording domain of the magnetic recording medium if coil 13 free from the tip can be driven with the tip.

The invention provides a device capable of high-speed recording and playback of data with elements having the capability of high-speed switching of the tip magnetized direction, on the order of 10 MHz, and to simplify manufacturing processes for a magnetic field driving coil.

The invention mainly comprises a core made of a non-magnetic material; a tip with a thin film comprising a soft magnetic material coating the core; a conductive magnetic recording medium; and a coil formed around the chip; supplies signal current to the coil, and performs magnetic recording with magnetic fields generated in response to the signal current. Furthermore, the invention controls the distance between the tip and the magnetic recording medium in response to the tunneling current generated between the tip and the magnetic recording medium. The nonmagnetic material forming the core comprises tungsten, platinum, iridium, platinum-iridium, gold, fiberglass, carbon fiber, or a combination of these, and the soft magnetic material coating the core comprises NiFe, CoZrNb, or CoFeSiB, the thin film being 500–3000 Å thick.

While there has been described and illustrated a high density recording device containing a tip having a core of a non magnetic material coated with a thin film of soft magnetic material, it will be apparent to those skilled in the art that modifications and variations are possible without deviating from the broad scope of the invention which shall be limited solely by the scope of the claims appended hereto.

Having thus described our invention, what we claim as new and desire to secure by Letters Patent is:

1. A high-density recording device comprising:

a tip having a core made of a nonmagnetic material and a thin film including a soft magnetic material coating said core, said tip having a longitudinal axis, a magnetic recording medium having a conductive surface;

a coil positioned above said conductive surface to apply a magnetic field to said tip, and a means for supplying an electric current signal to said coil, wherein signals are recorded on the magnetic recording medium with a magnetic field generated from the tip through the supply of said electric current signal to said coil, the magnetic field being in response to said electric current signal.

2. A high-density recording device according to claim 1, further comprising:

a means for generating a tunneling current between the tip and the magnetic recording medium; and a means for controlling the distance between the tip and the magnetic recording medium in response to said tunnel current.

3. A high-density recording device according to claim 1, wherein said coil is formed on an insulating film on said magnetic recording medium.

4. A high-density recording device according to claim 1, wherein said nonmagnetic material is selected from the group consisting of tungsten, platinum, iridium, platinum-iridium, gold, fiberglass, carbon fiber and combinations thereof.

5. A high-density recording device according to claim 1, wherein said soft magnetic material is selected from the group consisting of NiFe, CoZrNb and CoFeSiB and said thin film is in the range from 500 to 3000 Angstroms thick.

6. A high-density recording device according to claim 1, further including a means for positioning said tip including a piezo element.

7. A high-density recording device according to claim 1, further including a piezo element coupled to said recording medium for adjusting a gap between the surface of said recording medium and said tip.

8. A high-density recording device according to claim 1, further including a magnetoresistance effect element for reading magnetically recorded signals in said magnetic recording medium.

9. A high-density recording device, comprising:

a tip having a core made of a nonmagnetic material and a thin film including a soft magnetic material coating said core;

a conductive magnetic recording medium;

a means for generating a tunneling current between the tip and the magnetic recording medium; and a means for controlling the distance between the tip and the magnetic recording medium in response to said tunneling current; and a means for reading signals magnetically recorded on the magnetic recording medium.

10. A high-density recording device according to claim 9, wherein said nonmagnetic material is selected from the group consisting of tungsten, platinum, iridium, platinum-iridium, gold, fiberglass, carbon fiber, and combinations thereof.

11. A high-density recording device according to claim 9, wherein said soft magnetic material is selected from the group consisting of CoZrNb and CoFeSiB, and said thin film being 500 to 3000 Å thick.

12. A high-density recording device according to claim 9, further including a means for positioning said tip including a piezo element.

13. A high-density recording device comprising:

a tip comprising a nonmagnetic core and a high permeable magnetic coating, a conductive magnetic recording medium, a coil positioned above said conductive magnetic recording medium to apply a magnetic field to said tip, a current generator for providing an electric current signal to said coil, wherein data corresponding to the magnetic field caused from said electric current signal is written into said conductive magnetic recording medium.

* * * * *